(12) United States Patent
Yamamoto et al.

(10) Patent No.: US 7,658,182 B2
(45) Date of Patent: Feb. 9, 2010

(54) CANISTER MOUNTING STRUCTURE IN POWER GENERATING APPARATUS

(75) Inventors: Masanobu Yamamoto, Shizuoka-ken (JP); Takahide Sugiyama, Shizuoka-ken (JP)

(73) Assignee: Yamaha Motor Power Products Kabushiki Kaisha, Shizukoka (JP)

( * ) Notice: Subject to any disclaimer, the term of this patent is extended or adjusted under 35 U.S.C. 154(b) by 0 days.

(21) Appl. No.: 12/110,031

(22) Filed: Apr. 25, 2008

(65) Prior Publication Data

US 2008/0271717 A1 Nov. 6, 2008

(30) Foreign Application Priority Data

Apr. 25, 2007 (JP) .............................. 2007-116075

(51) Int. Cl.
*F02M 33/02* (2006.01)
*F02M 33/04* (2006.01)

(52) U.S. Cl. ..................................................... 123/519

(58) Field of Classification Search ................. 123/519, 123/518, 516, 520, 572, 2
See application file for complete search history.

(56) References Cited

U.S. PATENT DOCUMENTS

| | | | | |
|---|---|---|---|---|
| 3,673,997 A | * | 7/1972 | Sawada | ....................... 123/519 |
| 3,675,634 A | * | 7/1972 | Tatsutomi et al. | ........... 123/519 |
| 3,779,224 A | * | 12/1973 | Tagawa et al. | ............... 123/518 |
| 5,992,397 A | * | 11/1999 | Hideaki et al. | ............... 123/538 |
| 2004/0168653 A1 | * | 9/2004 | Radtke | .......................... 123/2 |
| 2004/0168654 A1 | * | 9/2004 | Radtke | .......................... 123/2 |
| 2007/0251510 A1 | * | 11/2007 | Dunkle et al. | ................ 123/520 |

FOREIGN PATENT DOCUMENTS

JP 07-034985 2/1995

OTHER PUBLICATIONS

U.S. Appl. No. 12/038,261, filed Feb. 27, 2008, Yamamoto, et al.
U.S. Appl. No. 12/109,933, filed Apr. 25, 2008, Yamamoto, et al.
U.S. Appl. No. 12/110,014, filed Apr. 25, 2008, Yamamoto, et al.

* cited by examiner

*Primary Examiner*—Mahmoud Gimie
(74) *Attorney, Agent, or Firm*—Keating & Bennett, LLP

(57) ABSTRACT

A power generating apparatus has a simplified structure for introducing fuel vapor from a fuel tank and blow-by gas produced in an engine into the engine's intake system so as to facilitate the manufacturing of the power generating apparatus. The power generating apparatus includes an engine for driving a generator, a canister containing an adsorbent for adsorbing thereonto fuel that evaporates from a fuel tank, an evaporative fuel inlet pipe for introducing fuel vapor purged from the adsorbent into an engine intake system, and a blow-by gas inlet pipe for introducing blow-by gas produced in the engine into the intake system. A first end of the evaporative fuel inlet pipe is connected to the canister, and a second end of the evaporative fuel inlet pipe is connected to an intermediate portion of the blow-by gas inlet pipe.

10 Claims, 4 Drawing Sheets

CANISTER MOUNTING STRUCTURE IN POWER GENERATING APPARATUS

CROSS-REFERENCE TO RELATED APPLICATIONS

The present application is based on and claims priority under 35 U.S.C. 119 to Japanese Patent Application No. 2007-116075, filed on Apr. 25, 2007, the entire contents of which is hereby incorporated by reference and should be considered part of this specification.

BACKGROUND OF THE INVENTION

1. Field of the Invention

The present invention relates to a canister mounting structure in a power generating apparatus, and more particularly to a mounting structure of a canister containing an adsorbent for adsorbing thereonto evaporative fuel evaporated from an engine fuel tank.

2. Description of the Related Art

An example of a conventional device having a canister containing the evaporative fuel adsorbent is described in Japanese Publication No. JP 7-34985. The device described in JP 7-34985 includes an engine, a fuel tank for storing fuel to be supplied to the engine, a canister containing an adsorbent for adsorbing fuel that evaporates from the fuel tank, and an evaporative fuel inlet pipe for introducing evaporative fuel purged from the adsorbent into an intake system of the engine. The device includes a communicating tube, through which the canister is in communication with the atmosphere.

The engine is driven by fuel supplied from the fuel tank and outputs a motive force of a predetermined magnitude. During the course of this operation, as described above, the adsorbent and the canister containing the adsorbent therein generally work as follows. Fuel vapor is roughly constantly produced in the fuel tank. During a period in which the engine is stopped or in a low-speed range as in idling, most of the fuel vapor is adsorbed by the adsorbent, thereby preventing the fuel vapor from being released into the atmosphere.

When the engine is in a medium-speed or high-speed operating range, a negative pressure builds up inside the intake system of the engine. The negative pressure causes atmospheric air to be sucked into the canister through the communicating tube of the canister. The fuel that evaporates from the fuel tank and flows toward the canister is sucked with the air, which is sucked into the canister through the communicating tube, into the intake system through the evaporative fuel inlet pipe and supplied to the engine therefrom, and then subjected to combustion. The fuel vapor that has been adsorbed onto the adsorbent is purged from the adsorbent by said sucked air, and subjected to combustion.

When the engine is operating, gas generally leaks from the combustion chamber to a valve actuating chamber and the like. The gas is what is called "blow-by gas" and contains unburned fuel. On this account, some conventional configurations include a blow-by gas inlet pipe through which the blow-by gas can be introduced into the intake system. According to such a configuration, the blow-by gas is introduced into the intake system through the blow-by gas inlet pipe, then subjected to combustion in the engine to prevent release of the blow-by gas into the atmosphere.

When the conventional art is applied to a power generating apparatus, a connector for connecting an evaporative fuel inlet pipe and the intake system and another connector for connecting the blow-by gas inlet pipe and the intake system are provided independently. This can complicate the structure of the engine and the manufacturing for the power generating apparatus.

SUMMARY OF THE INVENTION

In view of the circumstances noted above, one aspect of the present invention is to simplify a structure of a power generating apparatus configured to introduce fuel vapor from a fuel tank, which stores engine fuel therein, and blow-by gas produced in the engine into an intake system of the engine and facilitating the manufacture of the power generating apparatus.

In accordance with one aspect of the present invention, a power generating apparatus is provided. The power generating apparatus comprises engine for driving a generator, the engine comprising an intake system, a fuel tank for storing fuel to be supplied to the engine, and a canister configured to contain an adsorbent material therein for adsorbing thereonto fuel that evaporates from the fuel tank. The power generating apparatus also comprises an evaporative fuel inlet pipe coupled to the canister and configured to direct fuel vapor purged from the adsorbent into the intake system of the engine, and a blow-by gas inlet pipe configured to direct blow-by gas produced in the engine into the intake system. A first end of the evaporative fuel inlet pipe is coupled to the canister and a second end of the evaporative fuel inlet pipe is coupled to an intermediate portion of the blow-by gas inlet pipe.

In accordance with another aspect of the present invention, a method of operating a power generating apparatus having a canister arrangement is provided. The method comprises adsorbing fuel vapor from a fuel tank with an adsorbent material to inhibit release of the fuel vapor into the atmosphere, generating a blow-by gas via combustion of fuel in an engine of the power generating apparatus, and suctioning air into the adsorbent material to thereby purge said adsorbed fuel vapor from the adsorbent material, said suctioned air and purged fuel vapor combined with said blow-by gas and then directed to an intake system of the engine, where the combined flow is combusted.

BRIEF DESCRIPTION OF DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 4 figures.

DETAILED DESCRIPTION OF THE PREFERRED EMBODIMENTS

In the following detailed description, terms of orientation such as "front," "rear," "left" and "right" are used herein to simplify the description of the context of the illustrated embodiments. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations of the various components described above are possible.

Figure 1:
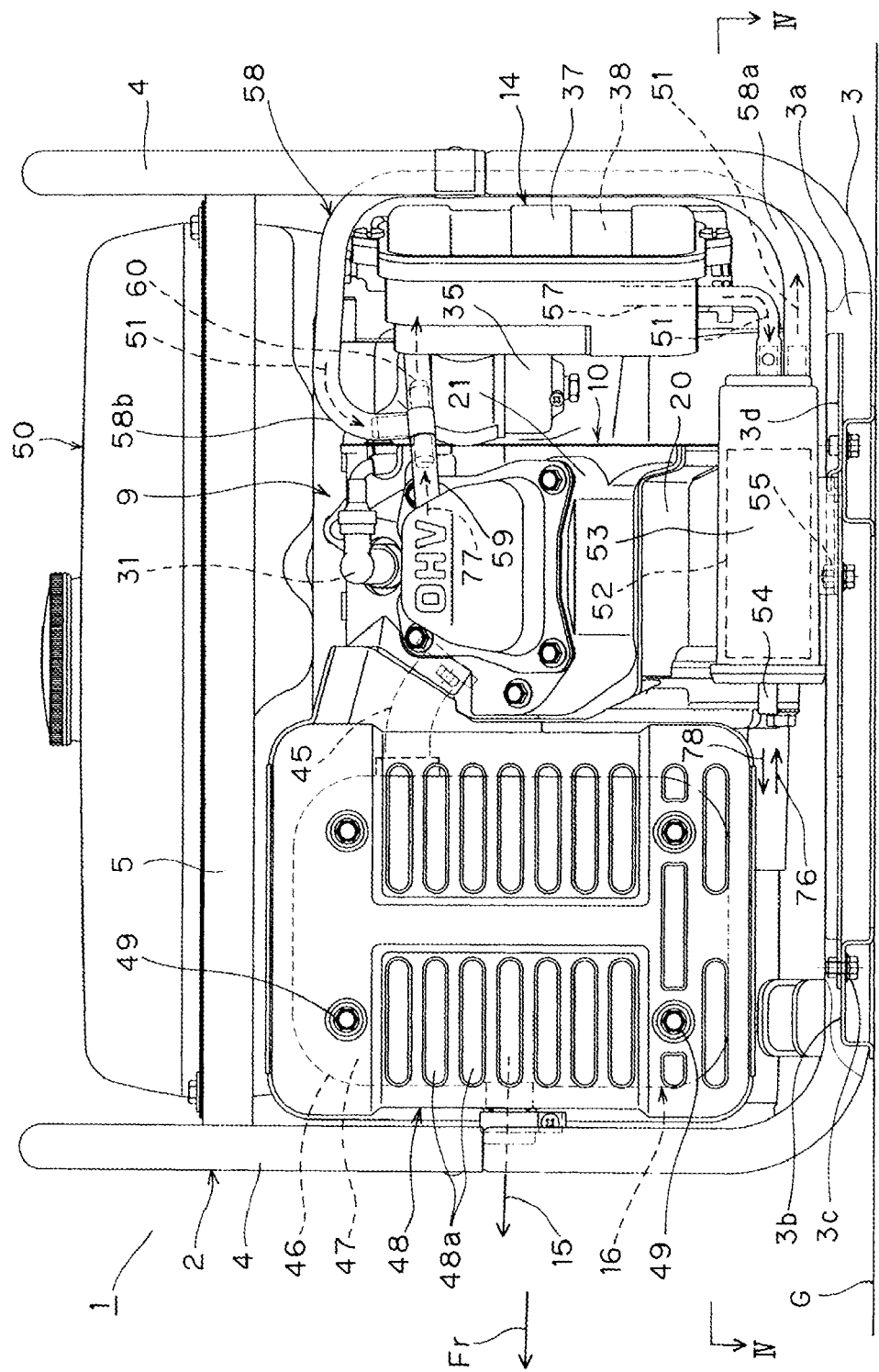
FIG. 1 is a schematic side view of one embodiment of a power generating apparatus.
Figure 2:
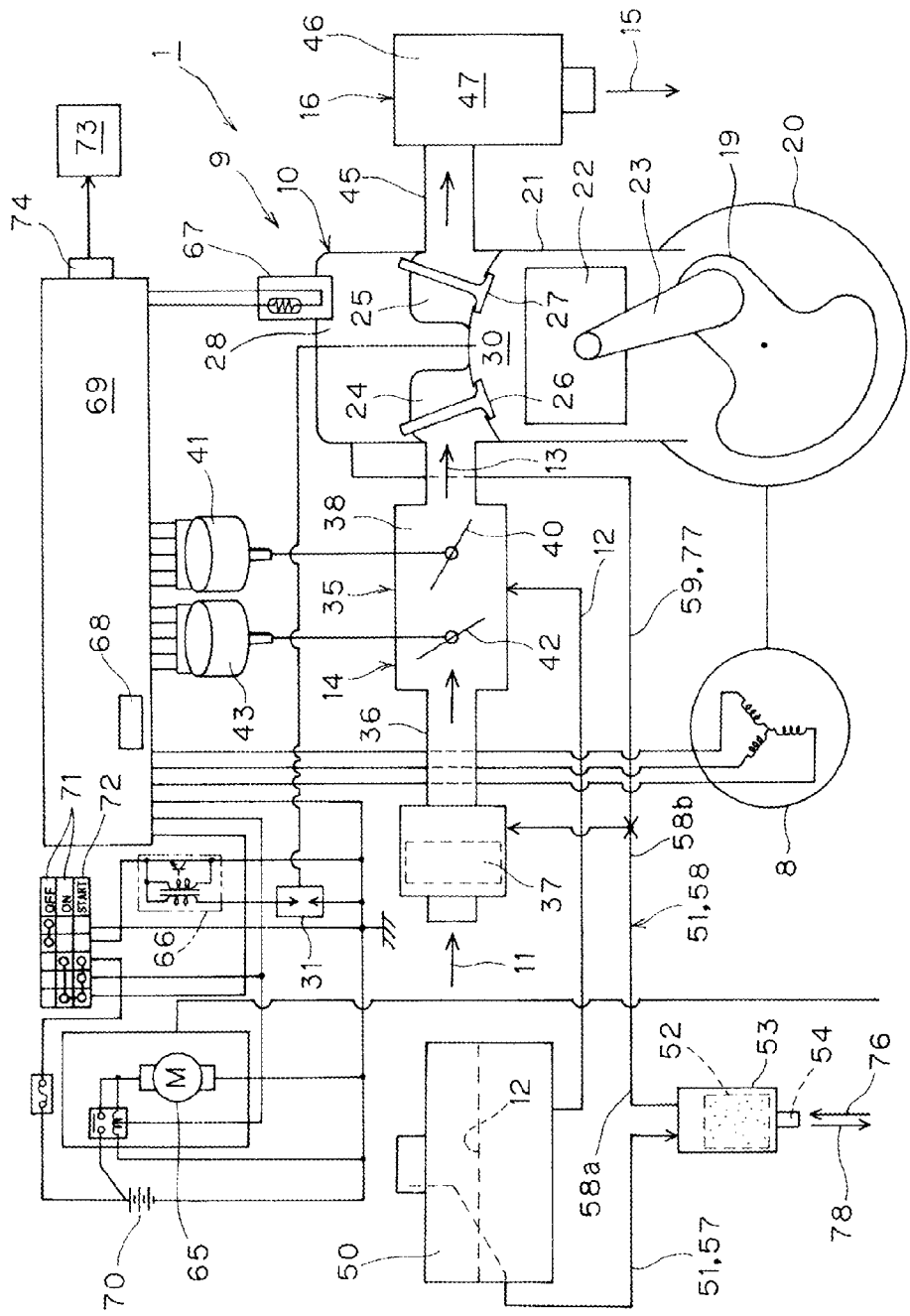
FIG. 2 is a block diagram of the power generating apparatus.
Figure 3:
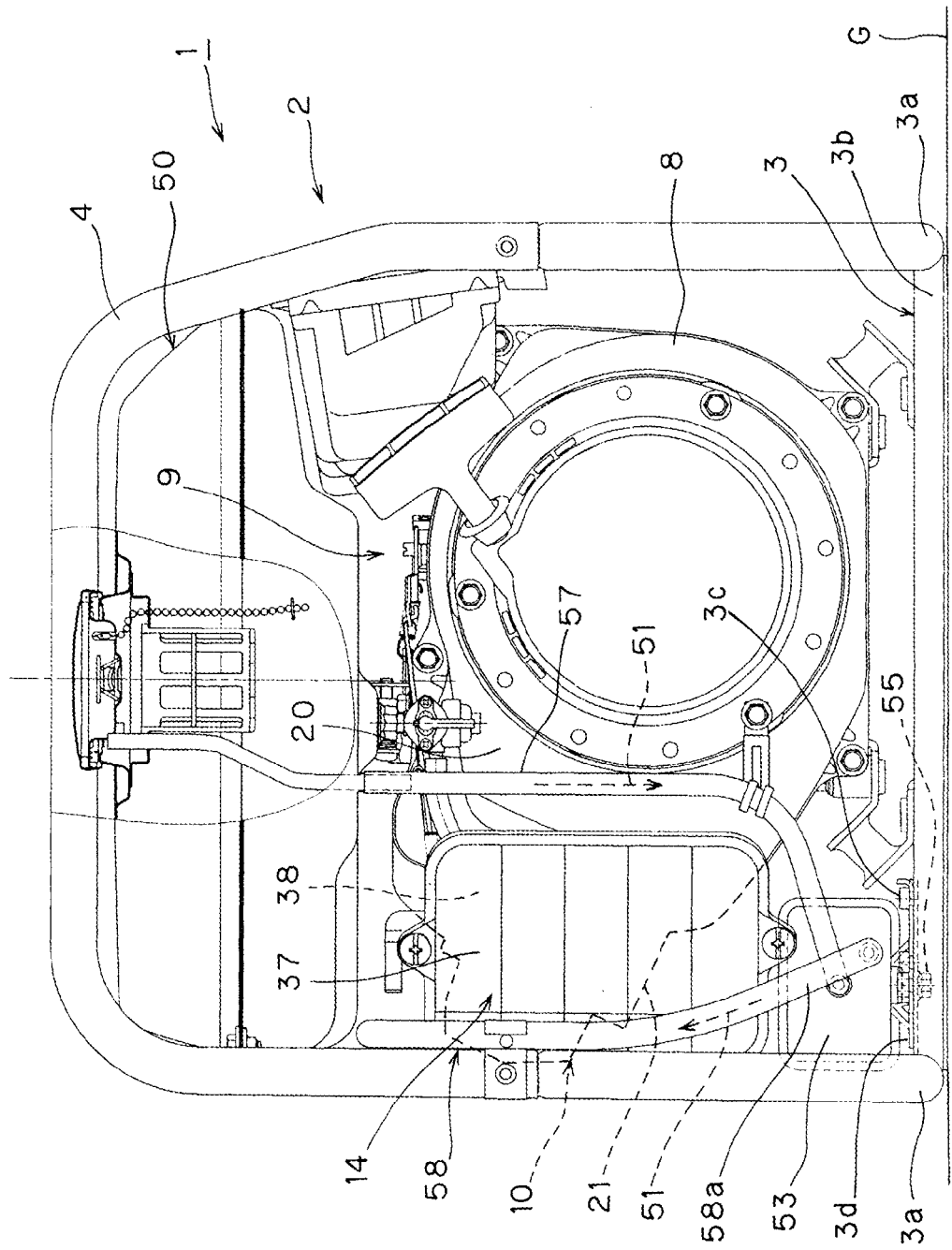
FIG. 3 is a schematic rear view of the power generating apparatus of FIG. 1.
Figure 4:
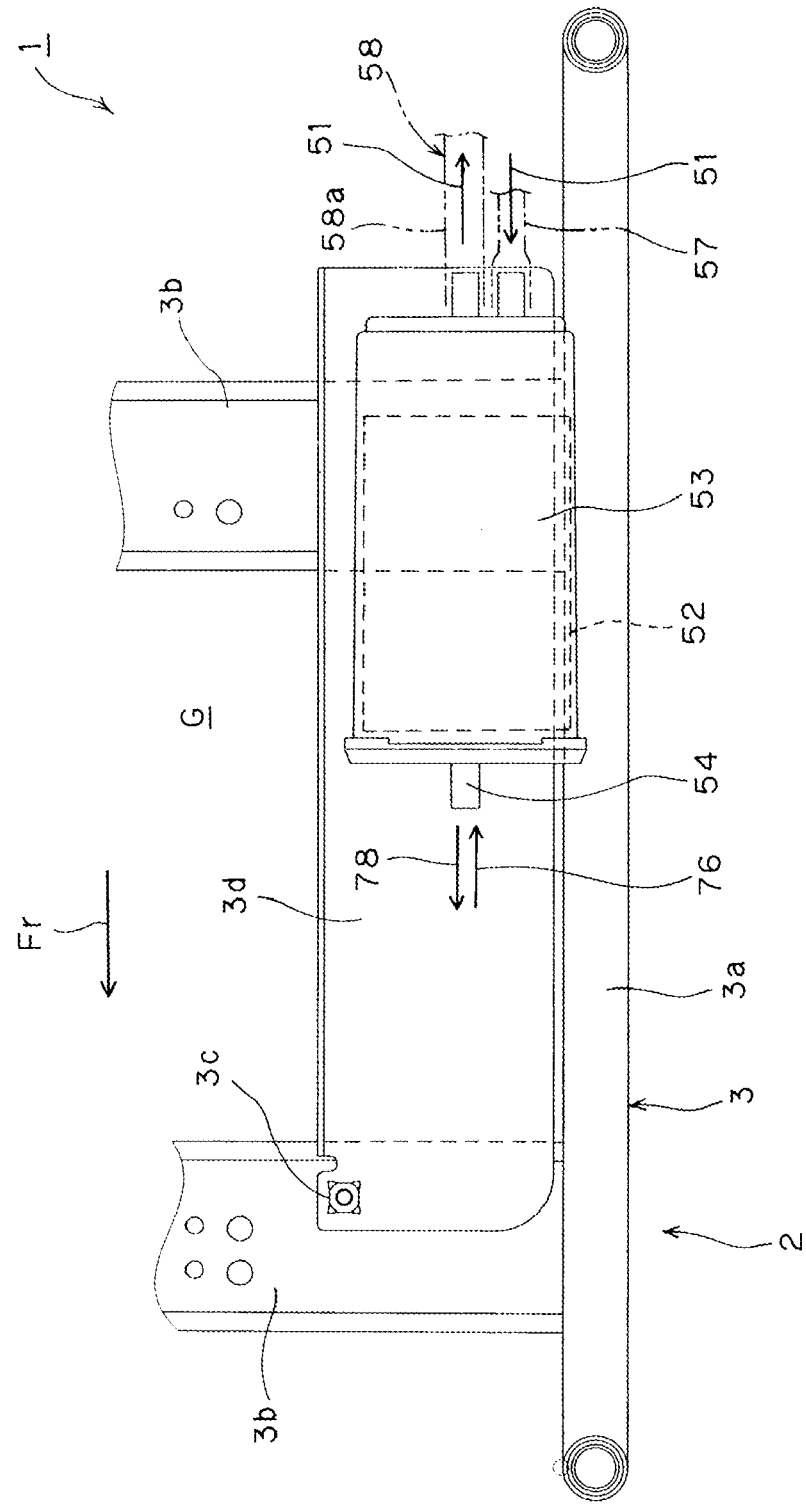
FIG. 4 is a schematic cross-sectional view taken along line IV-IV of FIG. 1.

Reference numeral 1 in FIGS. 1-4 denotes a portable power generating apparatus, in accordance with one embodiment. For clarity, in the following descriptions, a direction indicated by arrow Fr in the drawings is a forward direction of the apparatus, and left and right directions are directions as viewed along the forward direction.

The power generating apparatus 1 can include a frame 2 that can be placed on a working surface G, such as the ground or a floor surface. The frame 2 can include a chassis 3 that forms a lower end of the frame 2, a pair of front and rear upwardly-projecting handles 4 supported by front and rear ends of the chassis 3, respectively, and a pair of left and right connecting bars 5 forming left and right ends of the frame 2, respectively, and supported by the front and rear handles 4 thereacross.

The chassis 3 can include a pair of left and right side members 3a each extending in a fore-and-aft direction, a pair of front and rear cross members 3b each supported by the side members 3a and connected therebetween, and a plate bracket 3d that can be made of a sheet metal attached onto top surfaces of the cross members 3b with fasteners 3c. The bracket 3d can extend in the fore-and-aft direction approximately horizontally. In the illustrated embodiment, the bracket 3d is positioned in a bottom portion of the power generating apparatus 1 in the vicinity of or at a side end of the power generating apparatus 1.

An engine 9 for driving an alternating-current generator 8 can be mounted on the chassis 3. In one embodiment, the engine 9 is a four-cycle engine. However, the engine 9 can be other suitable engine-types. The engine 9 includes an engine body 10 that outputs a driving force, an intake system 14 for supplying an air-fuel mixture 13, which is a mixture of air 11 and fuel 12, to the engine body 10, and an exhaust system 16 for exhausting combustion gas, which is a resultant product of the combustion of the air-fuel mixture 13 in the engine body 10, to the atmosphere.

The engine body 10 includes a crankcase 20 supporting a crankshaft 19, a cylinder 21 in the crankcase 20 (e.g., in an upright orientation), a piston 22 axially slidably inserted into the cylinder 21, an interlocking rod 23 for interlocking between the crankshaft 19 and the piston 22, an intake valve 26 and an exhaust valve 27 for selectively opening and closing a first intake passage 24 and a first exhaust passage 25 formed in a projecting end of the cylinder 21, respectively, and a valve actuating mechanism (not shown) for selectively closing the intake and exhaust valves 26 and 27 housed in a valve actuating chamber 28 defined in the projecting end of the cylinder 21. The engine body 10 also includes a spark plug 31 with a discharging unit thereof facing a combustion chamber 30 inside the cylinder 21. Though the illustrated embodiment shows one cylinder 21 and the corresponding piston 22 and intake/exhaust valves 26, 27, one of ordinary skill in the art will recognize that the engine 9 can have multiple cylinders, each having a corresponding piston and intake/exhaust valves.

The intake system 14 can include a carburetor 35, an intake pipe 36, and an air cleaner 37, connected in series with the first intake passage 24. A space inside the carburetor 35, the intake pipe 36, and the air cleaner 37 is defined as a second intake passage 38, which is in communication with the first intake passage 24. The carburetor 35 can include a throttle valve 40 for adjusting an opening of the second intake passage 38, an actuator 41 (e.g., a step motor or other suitable motor type) for actuating the throttle valve 40, a choke valve 42 for adjusting an opening of the second intake passage 38 at a position upstream of the throttle valve 40, and an actuator 42 (e.g., a step motor or other suitable motor type) for actuating the choke valve 42.

The exhaust system 16 can include an exhaust pipe 45 and a muffler 46, connected in series with the first exhaust passage 25. A space inside the exhaust pipe 45 and the muffler 46 is defined as a second exhaust passage 47, which is in communication with the first exhaust passage 25. A muffler cover 48 can be provided for covering the entire muffler 46 from its laterally outer proximity. The muffler cover 48 is fixed onto a side wall of the muffler 46 with a plurality of fasteners 49 (e.g., bolts or screws). Though four fasteners 49 are shown in the illustrated embodiment, one of ordinary skill in the art will recognize that more or fewer fasteners can be used.

A plurality of communicating holes or openings 48a are defined in the muffler cover 48 and provide air communication between the inside and outside of the muffler cover 48. Air that is heated proximate the muffler 46 can be discharged from the power generating apparatus 1 in a laterally outward direction through the communicating holes 48a. Simultaneously, induced by this air discharge, air of lower temperature is supplied to the surroundings of the muffler 46. Thus, air cooling of the muffler 46 is attained.

A fuel tank 50 for storing fuel 12 to be supplied to the engine 9 through the carburetor 35 can be provided, for example, in the proximity above the engine 9. An adsorbent 52 for adsorbing thereonto fuel vapor 51 produced in the fuel 12 in the fuel tank 50, and a canister 53 containing the adsorbent 52 therein are provided. In the illustrated embodiment, the adsorbent 52 is activated carbon. However, other suitable adsorbent materials can be used in other embodiments. The canister 53, in one embodiment, can be made of a resin and formed into a box shape of a rectangular cross section. In one embodiment, the canister 53 can be positioned in a bottom portion of the power generating apparatus 1 in the vicinity of or at a side end of the power generating apparatus 1 and situated such that its long sides extend in the fore-and-aft direction. The canister 53 can be positioned above the bracket 3d of the chassis 3, and attached to the bracket 3d with a faster 55. In the illustrated embodiment, substantially the entire canister 53 is covered from below with the bracket 3d.

The canister can include, at its longitudinal first end, a communicating tube 54 which places the canister 53 in communication with the atmosphere. A first evaporative fuel inlet pipe 57, through which an upper end of the fuel tank 50 is in communication with a longitudinal second end of the canister 53, is provided. A second evaporative fuel inlet pipe 58, through which the second end of the canister 53 is in communication with the air cleaner 37 of the intake system 14, is also provided. A blow-by gas inlet pipe 59, through which the valve actuating chamber 28 is in communication with the air cleaner 37 of the intake system 14, is also provided. Each of the inlet pipes 57 to 59 can be formed of an elastic rubber hose. However, the passages 57-59 can be formed of other suitable materials, and need not all be of the same material.

More specifically, a first end 58a of the second evaporative fuel inlet pipe 58 is connected to the longitudinal second end of the canister 53, and a second end 58b of the second evaporative fuel inlet pipe 58 is connected to an intermediate portion of the blow-by gas inlet pipe 59. In the illustrated embodiment, the blow-by gas inlet pipe 59 is split at the intermediate portion, and a T-shaped joint pipe 60 connects two split-surface ends of the blow-by gas inlet pipe 59 with the second end 58b of the second evaporative fuel inlet pipe 58 in T connection. In another embodiment, a Y-shaped joint pipe can also be used to connect the split portions of the blow-by gas inlet pipe 59 and the evaporative fuel inlet pipe 58.

The power generating apparatus 1 can include a starter motor 65 for starting the engine 9, an ignition unit 66 for causing the spark plug 31 to electrically discharge as required, a temperature sensor 67 for detecting a temperature of the engine body 10 of the engine 9, and an engine speed sensor 68 for detecting the number of revolutions of the crankshaft 19 in the engine body 10 of the engine 9.

The power generating apparatus 1 can further include a controller 69, a battery 70, a main switch 71, and a starter switch 72. The controller 69 can electronically control the actuators 41 and 43, and the ignition unit 66 based on detection signals supplied from the temperature sensor 67 and the engine speed sensor 68. The battery 70 can be charged with a portion of the electric power generated by the generator 8 through the controller 69, and can supply electric power to the actuators 41 and 43, the ignition unit 66, and the like. The main switch 71 can switch on and off the power supply from the battery 70 to the starter motor 65, the controller 69, and the like. The starter switch 72 can switch on and off the power supply from the battery 70 to the starter motor 65 through the main switch 71. The controller 69 can include an outlet 74 through which the other portion of the electric power generated by the generator 8 can be output to an outside load 73.

When the engine 9 is driven under control of the controller 69, outside air 11 is sucked through the intake system 14 into the engine 9. The carburetor 35 mixes the fuel 12 with said sucked air 11 to produce the air-fuel mixture 13. The air-fuel mixture 13 is subjected to combustion in the engine 9. Combustion gas, which is a resultant product of the combustion in the engine 9, is exhausted as the exhaust 15 through the exhaust system 16 into the atmosphere. The engine 9, which can be driven as described above, can drive the generator 8 to generate electric power, which can be output to the load 73 through the outlet 74 of the controller 69.

During the above operation, the adsorbent 52 and the canister 53 work as follows. Fuel vapor 51 is roughly constantly produced in the fuel tank 51. When the engine 9 is stopped or in a low-speed range (e.g., idling), most of the fuel vapor 51 is adsorbed by the adsorbent 52 through the first evaporative fuel inlet pipe 57, thereby preventing the fuel vapor 51 from being released into the atmosphere.

When the engine 9 is in a medium-speed or high-speed range, a negative pressure builds up inside the intake system 14. The negative pressure causes air 76 to be sucked into the canister 53 from the outside through the communicating tube 54 of the canister 53. The fuel 51 that evaporates from the fuel tank 50 and flows through the first evaporative inlet pipe 57 toward the canister 53 is sucked with the air 76, which is sucked into the canister 53 through the communicating tube 54, into the air cleaner 37 of the intake system 14 through the second evaporative fuel inlet pipe 58 and a downstream portion of the blow-by gas inlet pipe 59, and the combined flow is supplied to the engine 9, where it is then subjected to combustion. The fuel vapor 51 that has been adsorbed onto the adsorbent 52 is purged from the adsorbent 52 by the sucked air 76 and flows along with the air 76 sucked through the communicating tube 54 into the canister 53, and subjected to combustion in the engine 9 as in the above case.

During a period in which the engine 9 is driving, blow-by gas 77 generated in the valve actuating chamber 28 is introduced into the air cleaner 37 of the intake system 14 and through the blow-by gas inlet pipe 59 supplied to the engine 9 therefrom, then subjected to combustion. Water 78 that accumulates in the canister 53 can be discharged to the atmosphere through the communicating tube 54.

According to the illustrated configuration, the first end 58a of the second evaporative fuel inlet pipe 58 is connected to the canister 53, and the second end 58b of the second evaporative fuel inlet pipe 58 is connected to the intermediate portion of the blow-by gas inlet pipe 59.

Accordingly, the fuel vapor 51 is sucked into the intake system 14 through the second evaporative fuel inlet pipe 58 and the downstream portion of the blow-by gas inlet pipe 59, while the blow-by gas 77 is sucked into the intake system 14 through the blow-by gas inlet pipe 59. Then each of the fuel vapor 51 and the blow-by gas 77 is subjected to combustion in the engine 9.

The configuration in the illustrated embodiment requires a smaller number of inlet pipes for the intake system 14 in the power generating apparatus 1 as compared with a configuration in which both an end of the second evaporative fuel inlet pipe 58 and an end of the blow-by gas inlet pipe 59 are separately connected to the intake system 14 of the engine 9. The reduction in the number of the inlet pipes provides a power generating apparatus 1 with a simplified structure, and thereby facilitates the manufacturing thereof.

Furthermore, the first end 58a of the second evaporative fuel inlet pipe 58 is connected with the intermediate portion of the blow-by gas inlet pipe 59—in short, by connecting the pipes. Thus, the manufacturing work for the power generating apparatus 1 is facilitated. Furthermore, when the canister 53 is to be provided as an add-on part, the configuration of the illustrated embodiment eliminates the need to add another connector to the intake system 14 to receive an inlet pipe for the canister 53, thereby facilitating the retrofitting of the canister 53.

As described above, the second end 58b of the second evaporative fuel inlet pipe 58 is connected to an upper part of an intermediate portion of the blow-by gas inlet pipe 59.

The structure in the illustrated embodiment inhibits the undesirable intrusion of oil and water produced by liquefaction of the blow-by gas 77 in the blow-by gas inlet pipe 59 into the second end 58b of the second evaporative fuel inlet pipe 58 by way of the intermediate portion of the blow-by gas inlet pipe 59. Accordingly, intrusion of the oil and the like into the canister 53 through the second evaporative fuel inlet pipe 58 is inhibited, which maintains performance of the adsorbent 52 in the canister 53 in a good state.

As described above, the chassis 3 that supports the engine 9 and that can be placed on the working surface G is provided. The chassis 3 includes the bracket 3d that can extend substantially horizontally. The canister 53 can be positioned above the bracket 3d and attached to the chassis 3.

According to the illustrated configuration, the bracket 3d protects the canister 53, which can be formed with a thin plate and fragile to external force, from being damaged by external force that can be exerted from a protrusion on the working surface G or the like when the power generating apparatus 1 is dropped while being carried or the like. Hence, even when the canister 53 is positioned at a lower end of the power generating apparatus 1 for convenience of compact layout with the other component parts, the canister 53 is protected from being damaged by external force.

The above descriptions have been made based on the drawings. Alternatively, the blow-by gas inlet pipe 59 may induce the blow-by gas 77 generated inside the crankcase 20 into the intake system 14. The inlet pipe 57 to 59 may be elastic resins tubes or metal pipes. However, the inlet pipe 57, 59 can be of other suitable materials. The bracket 3d may be a perforated metal or of a grid type. The canister 53 may be attached to the side member 3a or the cross member 3b of the chassis 3. The bracket 3d does not necessarily cover substantially the entire canister 53 from below, and can cover only a portion thereof.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A power generating apparatus, comprising:
    an engine for driving a generator, the engine comprising an intake system;
    a fuel tank for storing fuel to be supplied to the engine;
    a canister configured to contain an adsorbent material therein for adsorbing thereonto fuel that evaporates from the fuel tank;
    an evaporative fuel inlet pipe coupled to the canister and configured to direct fuel vapor purged from the adsorbent into the intake system of the engine; and
    a blow-by gas inlet pipe configured to direct blow-by gas produced in the engine into the intake system, a first end of the evaporative fuel inlet pipe being coupled to the canister and a second end of the evaporative fuel inlet pipe being coupled to an upper-facing part of an intermediate portion of the blow-by gas inlet pipe.

2. The power generating apparatus of claim 1, wherein the second end of the evaporative fuel inlet pipe is coupled to a top side of the intermediate portion of the blow-by gas inlet pipe, the second end of the evarporative fuel inlet pipe having a diameter generally equal to a transverse cross-sectional diameter of the intermediate portion along its length.

3. The power generating apparatus of claim 1, wherein the intermediate portion of the blow-by gas inlet pipe comprises a T-shaped joint pipe with two ends that connect to corresponding split ends of the blow-by gas inlet pipe and a third end that connects to the second end of the evaporative fuel inlet pipe.

4. The power generating apparatus of claim 1, further comprising a chassis that can be placed on a working surface while supporting the engine, the chassis comprising a bracket extending substantially horizontally, the canister being positioned above the bracket and attached to the chassis.

5. The power generating apparatus of claim 4, wherein the canister is attached to the chassis such that side members of the chassis are disposed between the canister and a support surface on which the power generating apparatus can be placed.

6. The power generating apparatus of claim 4, wherein the canister is oriented in a generally horizontal direction.

7. A method of operating a power generating apparatus having a canister arrangement, comprising:
    adsorbing fuel vapor from a fuel tank with an adsorbent material to inhibit release of the fuel vapor into the atmosphere;
    generating a blow-by gas via combustion of fuel in an engine of the power generating apparatus; and
    suctioning air into the adsorbent material to thereby purge said adsorbed fuel vapor from the adsorbent material, said suctioned air and purged fuel vapor combined with said blow-by gas and then directed to an intake system of the engine, where the combined flow is combusted, wherein suctioning is performed when the power generating apparatus switches from operating at a low-speed range to operating at a medium or high speed range.

8. The method of claim 7, wherein the adsorbent material comprises activated carbon.

9. A power generating apparatus, comprising:
    an engine for driving a generator, the engine comprising an intake system;
    a fuel tank for storing fuel to be supplied to the engine;
    a canister configured to contain an adsorbent material therein for adsorbing thereonto fuel that evaporates from the fuel tank;
    an evaporative fuel inlet pipe coupled to the canister and configured to direct fuel vapor purged from the adsorbent into the intake system of the engine; and
    a blow-by gas inlet pipe configured to direct blow-by gas produced in the engine into the intake system, a proximal end of the evaporative fuel inlet pipe being coupled to the canister and a distal end of the evaporative fuel inlet pipe being coupled to an intermediate portion of the blow-by gas inlet pipe, the intermediate portion having generally the same transverse cross-sectional diameter along its length as a diameter of a proximal portion and a distal portion of the blow-by gas inlet pipe.

10. The power generating apparatus of claim 9, wherein the distal end of the evaporative fuel inlet pipe is coupled to a top side of the intermediate portion of the blow-by gas inlet pipe.

* * * * *